United States Patent Office 3,520,650
Patented July 14, 1970

3,520,650
RECOVERY OF VANADIUM VALUES FROM RESIDUES
Colin Francis Cole and David John Spencer, Stockton-on-Tees, England, assignors to British Titan Products Company Limited, Billingham, England, a corporation of the United Kingdom
No Drawing. Filed Oct. 10, 1967, Ser. No. 674,119
Claims priority, application Great Britain, Oct. 17, 1966, 46,412/66
Int. Cl. C22b 59/00; C01b 9/00
U.S. Cl. 23—20                                                7 Claims

ABSTRACT OF THE DISCLOSURE

Process for recovering vanadium from vanadium-containing solids comprising suspending such solids in a liquid capable of dissolving chlorine and treating such suspension with chlorine under superatmospheric pressure. The said solids can be the residue from the purification of titanium tetrachloride by refluxing with a mineral oil. In such case the said liquid is suitably titanium tetrachloride.

---

This invention relates to the recovery of vanadium from vanadium-containing solids.

The problem of such vanadium recovery has for long been met in the titanium industry, and more particularly in the chlorination of titaniferous materials. Titaniferous materials containing rutile are chlorinated in the presence of carbon to give an impure titanium tetrachloride which contains, inter alia, carbon, vanadium and iron impurities. Of these impurities, the most significant from the present point of view is vanadium. Vanadium is an undesirable impurity in titanium tetrachloride in many applications, for example in the manufacture of titanium metal and in pigmentary titanium dioxide prepared by oxidation of the titanium tetrachloride. A number of methods of removing the vanadium impurities from the titanium tetrachloride have been suggested in the past, but these generally result in a vanadium-containing residue which is discarded and wasted. Vanadium is quite a valuable material, but it is difficult to recover from such residues.

A standard method of purifying impure titanium tetrachloride is to reflux it with a mineral oil, for example as described in applicants' own British patent specification No. 879,315. Other purification agents which can be used include finely divided metals, such as copper, hydrogen sulphide and saturated and unsaturated hydrocarbons.

Refluxing the impure titanium tetrachloride with the purifying agent produces a water-white substantially pure titanium tetrachloride distillate and a sludge residue containing titanium tetrachloride and the solids resulting from the purifying agent. Such sludge, in which the vanadium is considerably concentrated, can be distilled to dryness in order to recover all the titanium tetrachloride, but the solid product thus produced is highly reactive and difficult to handle.

According to the present invention, vanadium-containing solids are suspended in a liquid capable of dissolving chlorine and such suspension is treated with chlorine under super-atmospheric pressure. It is found that this enables the vanadium to be converted into the form of volatile vanadium chloride, generally vanadium oxychloride, and this may fairly readily be recovered.

In the particular case of the vanadium-containing solid being the aforementioned residue from the purification of impure titanium tetrachloride, there will nearly always be non-volatile titanium associated with the solid. Furthermore, titanium tetrachloride would normally be used as the suspending liquid of the invention, thus avoiding any necessity of removing all of the titanium tetrachloride from the above described purification sludge. Under these circumstances, the chlorination of the present invention will result in the volatile vanadium chloride produced being admixed both with titanium tetrachloride from the sludge and also with new titanium tetrachloride resulting from chlorination of titanium associated with the solid. The increased ratio of vanadium chloride to titanium tetrachloride in the mixture permits the separation of the greater part of the vanadium chloride by fractional distillation in spite of the fact that there is only 9° C. difference in their boiling points. Generally, any residual vanadium chloride/titanium tetrachloride mixture is recycled to the initial purification stage. The same cannot be said of the impure titanium tetrachloride resulting from the chlorination of titaniferous materials since this contains only a very small amount of vanadium impurity and the difficulty of removing such small amounts of vanadium by physical methods is the basic reason why complicated chemical purification steps of the type mentioned above are necessary.

The use of super-atmospheric pressure with the process of the present invention is most important since, by this means, over 99% of the vanadium in the vanadium-containing solid can be chlorinated and recovered. Only a much smaller percentage can be chlorinated and recovered if the chlorination is conducted under atmospheric pressure. Suitable pressures are 5–250 p.s.i.g., preferably 20–150 p.s.i.g. The precise reason why super-atmospheric pressure should be advantageous is not known with certainty, but it is believed that the increase of pressure increases the solubility of the chlorine in the suspended liquid. The chlorine in the solution is therefore more intimately contacted with the solid and more efficient chlorination is obtained.

The chlorination temperature is normally 20–250° C., preferably 100–180° C.

The suspension to be chlorinated by the present invention will normally have a solids content in the range 5–60% by weight, preferably 10–40% by weight.

The typical analysis of a solid residue resulting from the above described purification of impure titanium tetrachloride by refluxing with mineral oil is as follows:

|  | Percent |
| --- | --- |
| Carbon | 13.4 |
| Hydrogen | 2.0 |
| Vanadium (as $V_2O_5$) | 29.6 |
| Titanium (as $TiO_2$) | 12.4 |
| Iron (as $Fe_2O_3$) | 1.9 |

In addition to the vanadium and titanium, hydrogen is also chlorinated if present in the starting solid, giving rise to hydrogen chloride. Other minor constituents of the solid (e.g. tungsten, molybdenum and niobium) may also be chlorinated and may be separated and recovered from the product.

A suitable small scale apparatus for use in the present process comprises a stainless steel pressure vessel having a lid bolted to its upper end, the lid being sealed with a gasket. Inlet and outlet pipes having valves are attached to the lid, and the vessel is provided with a bursting disc and pressure gauge. Provision is made for the vessel to be mechanically rocked, and it is surrounded with a resistance furnace to provide the necessary heat. A thermocouple is provided through the lid, dipping into the suspension in the vessel within a sheath.

In a typical method, the suspension of solids is introduced into the vessel and air is removed by purging with chlorine. The desired amount of chlorine is then admitted and the valves closed. The vessel is then heated. Suitable conditions are then maintained for the desired length of time, after which the vessel is cooled. The suspension is removed from the vessel and introduced into a distillation unit, where the solid and volatile products are separated. The vanadium chloride can, if desired, be converted to another vanadium compound or to vanadium metal.

In large scale operation, the process would preferably be carried out with continuous introduction of chlorine, the pressure within the vessel being controlled by a pressure release valve.

EXAMPLE

A number of runs have been conducted using the particular apparatus and method just described on the solid residue having the above-tabulated analysis. The conditions and results are contained in the following table. Runs 1 to 4 were in accordance with the present invention, using super-atmospheric pressure, but run 5 was for comparative purposes using atmospheric pressure. The very short reaction time of run 4 was found to be adequate due to the high pressure and temperature used.

TABLE

| Expt. | Reaction temp., °C. | Hours at reaction temp. | Pressure at operating temp., p.s.i.g. | Removed from solids by chlorination, percent | | |
|---|---|---|---|---|---|---|
| | | | | Ti | V | H |
| 1 | 122 | 1.0 | 70 | 92.5 | 94.5 | |
| 2 | 153 | 1.0 | 88 | 96.0 | 99.91 | 79 |
| 3 | 176 | 1.0 | 98 | 98.4 | 99.98 | |
| 4 | 182 | 0.1 | 120 | 94.5 | 99.78 | 75 |
| 5 | 136 | 1.5 | (¹) | | 74 | |

¹ Atmospheric pressure.

What is claimed is:

1. A process for recovering vanadium from vanadium-containing solids, said solids being the residue from the purification of impure titanium tetrachloride by refluxing said impure titanium tetrachloride in the presence of mineral oil comprising:

(A) suspending said solids in liquid titanium tetrachloride;
(B) treating the resultant suspension with chlorine under super-atmospheric pressure, whereby a volatile vanadium oxychloride compound is produced and,
(C) recovering said volatile vanadium oxychloride compound.

2. Process as claimed in claim 1 wherein the pressure is 5–250 p.s.i.g.

3. Process as claimed in claim 2 wherein the pressure is 20–150 p.s.i.g.

4. Process as claimed in claim 1 wherein the chlorine treatment is effected at 20–250° C.

5. Process as claimed in claim 4 wherein the chlorine treatment is effected at 100–180° C.

6. Process as claimed in claim 1 wherein the solids content in the suspension is 5–60% by weight.

7. Process as claimed in claim 6 wherein the solids content in the suspension is 10–40% by weight.

References Cited

UNITED STATES PATENTS

| 901,611 | 10/1908 | Greenawalt | 75—112 X |
| 1,779,856 | 10/1930 | Saklatwalla. | |
| 2,836,547 | 5/1958 | Stoddard et al. | |
| 3,227,545 | 7/1966 | Hildreth | 75—112 X |
| 3,384,448 | 5/1968 | Mason et al. | 23—20 |

FOREIGN PATENTS

| 297,096 | 12/1928 | Great Britain. |
| 879,315 | 10/1961 | Great Britain. |

HERBERT T. CARTER, Primary Examiner

U.S. Cl. X.R.

23—87, 22